United States Patent [19]
Thomas et al.

[11] Patent Number: 5,883,642
[45] Date of Patent: Mar. 16, 1999

[54] PROGRAMMABLE RETARGETER METHOD AND APPARATUS

[75] Inventors: Troy M. Thomas, Ft. Collins, Colo.; David A. Madsen, Smithfield, Utah; Michael J. Phelps, Cheyenne, Wyo.

[73] Assignee: Hewlett Packard Company, Palo Alto, Calif.

[21] Appl. No.: 846,830

[22] Filed: May 1, 1997

[51] Int. Cl.⁶ ..................................................... G09G 5/36
[52] U.S. Cl. ........................................... 345/515; 345/508
[58] Field of Search ........................... 345/501, 507–509, 345/515, 516; 711/1, 5, 200, 211

[56]  References Cited

U.S. PATENT DOCUMENTS 5,712,999   1/1998   Guttag et al. ........................... 345/516

*Primary Examiner*—Kee M. Tung

[57]  ABSTRACT

The present invention relates to a programmable retargeter memory device which receives data being sent to addresses designated by said data and which retargets the data by replacing the addresses designated by the data with new addresses. The retargeter memory device of the present invention comprises an address memory and a data memory. The address memory comprises a plurality of address memory locations for storing retargeted addresses. The address memory is capable of being written to and read from to programmably alter the retargeted addresses stored therein and to output retargeted addresses therefrom. The data memory comprises a plurality of data memory locations for storing data associated with the retargeted addresses stored in the address memory and is capable of being written to and read from. Each data memory location is associated with one address memory location such that a write to a particular data memory location causes the retargeted address stored in the address memory location associated with the particular data memory location to be released from the address memory and sent to the location designated by the released retargeted address followed by the data written to the particular data memory location. The programmable retargeter memory device of the present invention can be provided with a release and re-order function which allows the data received by the programmable retargeter memory device of the present invention to be re-ordered before being sent to the retargeted addresses downstream.

15 Claims, 12 Drawing Sheets

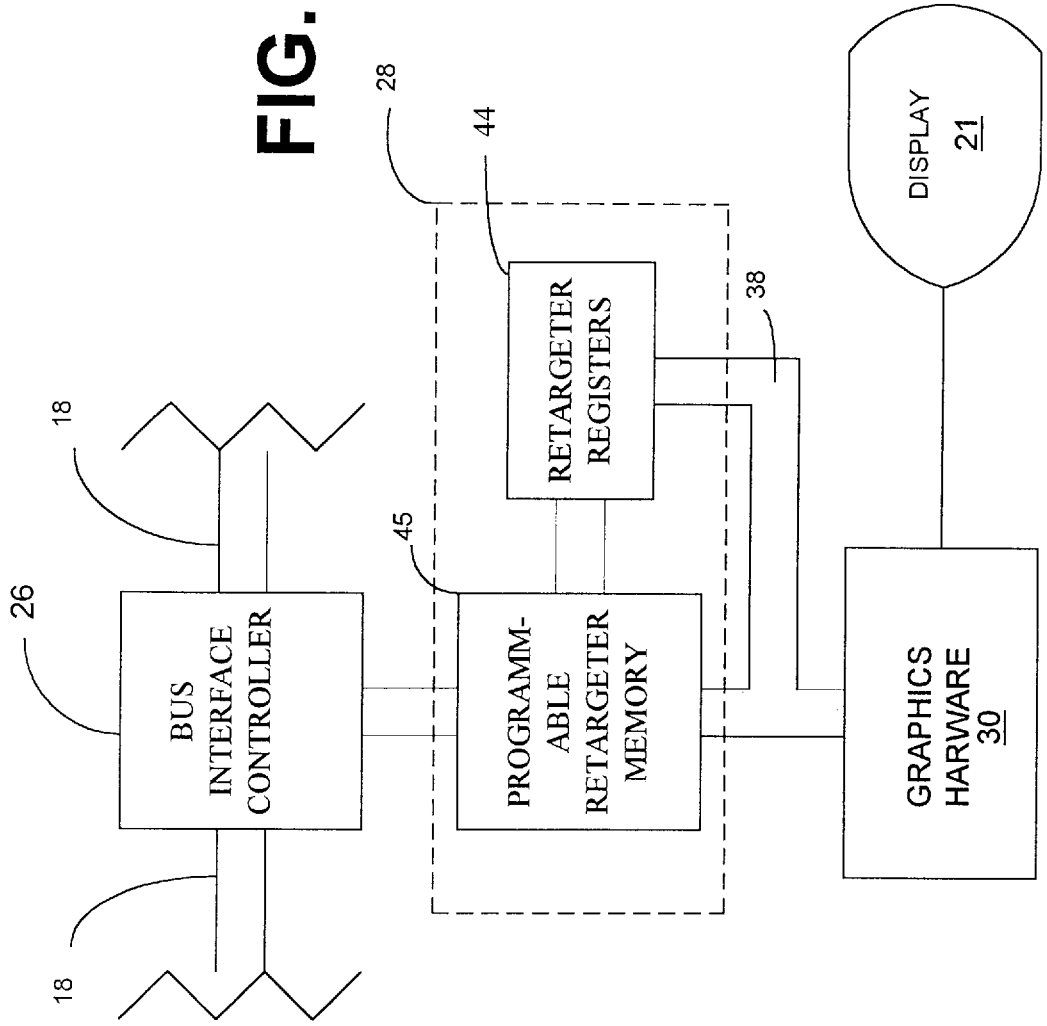

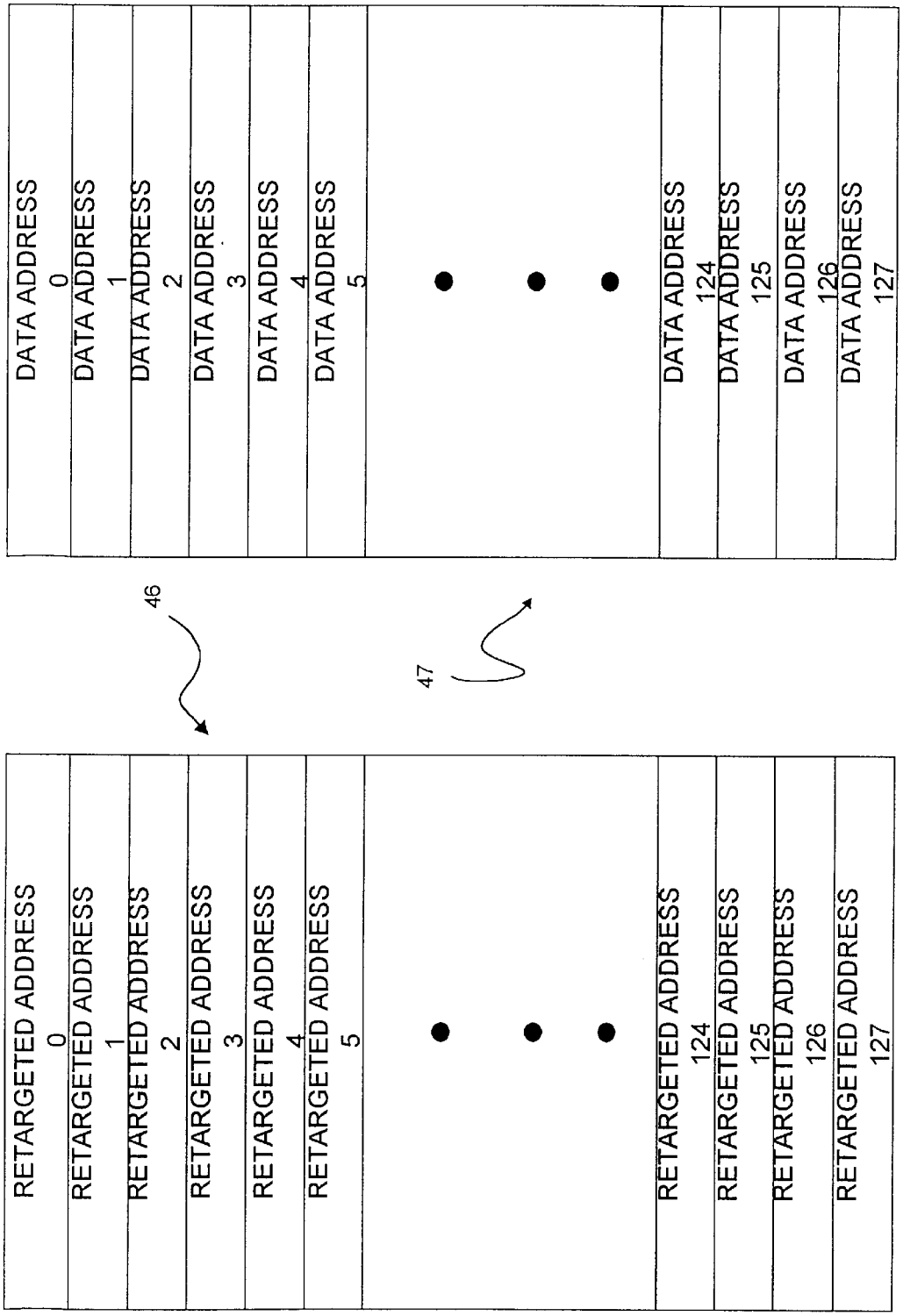

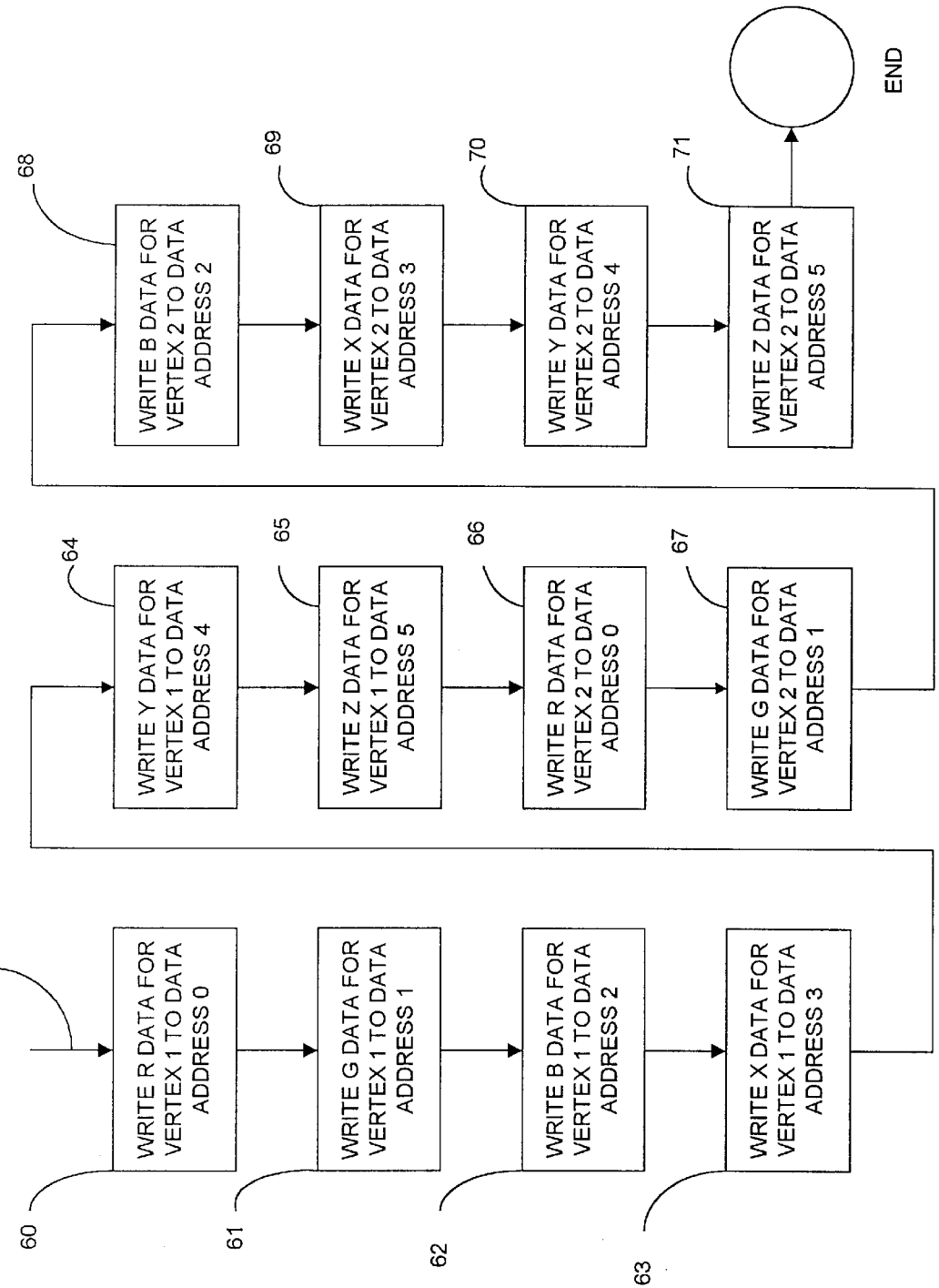

PROGRAMMABLE RETARGETER METHOD AND APPARATUS

TECHNICAL FIELD OF THE INVENTION

The present invention generally relates to a programmable retargeter method and apparatus and, more particularly, to a programmable retargeter memory device which receives data written to sequential addresses in the programmable retargeter memory device and which replaces the addresses with new addresses and sends the data downstream to the new addresses.

BACKGROUND OF THE INVENTION

Computer graphics display systems are commonly used for displaying graphical representations of objects on a two-dimensional video display screen. Current computer graphics display systems provide highly detailed representations and are used in a variety of applications. A computer graphics display system generally comprises a central processing unit (CPU), system memory, a video display screen and graphics hardware, such as a geometry accelerator and/or a rasterizer. The graphics hardware and the video display screen communicate with the host processor via an I/O bus, such as, for example, a PCI bus. The graphics hardware and the video display screen are allocated addresses on the I/O bus. Data sent from the host CPU along the I/O bus is sent to the particular I/O device designated by the address contained in the data. Generally, the address also specifies an address within the particular I/O device to which the data has been sent.

In computer graphics display systems, an object to be presented on the display screen usually is broken down into graphics primitives. Primitives are basic components of a graphics display and may include points, lines, vectors and polygons (e.g., triangles and quadrilaterals). Typically, a hardware/software scheme is implemented to render, or draw, the graphics primitives that represent a view of one or more objects being represented on the display screen. The host CPU defines the primitive in terms of the X, Y and Z coordinates of its vertices, the normals of the vertices, $N_x$, $N_y$ and $N_z$, the red, green, blue and alpha (R, G, B and α) color values of the vertices, and the texture values S, T, R and Q for the vertices. Alpha is a transparency value. Additional primitive data may be used in specific applications.

An Application Program Interface, or API, is the software interface between the host CPU and the rendering hardware. An API processes the data from the CPU and provides the processed data to the graphics hardware located downstream which further processes the data into an image to be displayed on the display screen. The graphics hardware interpolates the primitive data to compute the display screen pixels that represent each primitive and the R, G, B and α values for each pixel.

Generally, the data processed by the host CPU in accordance with the API is coalesced in a command data (CD) buffer located in the I/O interface before being sent to the graphics hardware. Coalescing involves sending data in "bursts" with only the address of the first piece of data in a string of sequential data being designated. A counter increments the address of the first piece of data to determine the addresses of the succeeding data. By using coalescing, less data is required to be processed by the host CPU and sent to the I/O interface. Once the commands and data have been coalesced in the CD buffer, the data is sent to addresses in the graphics hardware which are designated by the commands stored in the CD buffer.

In order for the graphics hardware to properly process data, the data must be received by the graphics hardware in a predetermined order. Some APIs organize data to be sent downstream to the graphics hardware in a manner which is inconsistent with the order in which the graphics hardware must receive it. Examples of APIs include OpenGL, Starbase and PEX. When Starbase or PEX is used as the API, for example, vertex data is sent to the geometry accelerator with the X, Y and Z coordinates first whereas many geometry accelerators must see the X, Y and Z coordinates last. Therefore, in order for coalescing to be utilized, the data must be rearranged into the order in which it must be received by the graphics hardware. One known way of addressing this problem is to utilize a software program in conjunction with the API which converts the data into a form which is suitable for use by the graphics hardware. However, this solution presents the host CPU with a substantial increase in the amount of data which must be processed by it and, therefore, results in a substantial performance penalty to the computer graphics display system in terms of decreased throughput.

Another way of addressing the problem of providing coalescing for multiple APIs is to implement a large amount of address space for each API in order to accommodate the different vertex data formats. However, this solution requires additional address space and logic to be implemented for each of the different API vertex data formats, which is neither desirable nor practical. Furthermore, this solution is even less desirable in view of the growing number of APIs.

Accordingly, a need exists for a method and apparatus which allows a computer graphics display system to efficiently implement any API and which allows the advantages of coalescing to be realized, thus maximizing performance and efficiency.

SUMMARY OF THE INVENTION

The present invention provides a programmable retargeter method and apparatus. The programmable retargeter of the present invention comprises a programmable retargeter memory device which receives data being sent to addresses designated in the data and which retargets the data by replacing the addresses designated in the data with new addresses. The retargeter memory device of the present invention comprises an address memory and a data memory. The address memory comprises a plurality of address memory locations for storing retargeted addresses. The address memory is capable of being written to and read from to programmably alter the retargeted addresses stored therein and to output retargeted addresses therefrom. The data memory comprises a plurality of data memory locations to which data associated with the retargeted addresses stored in the address memory is written. Each data memory location is associated with one address memory location such that a write to a particular data memory location causes the retargeted address stored in the address memory location associated with the particular data memory location to be released from the address memory and the data to be sent to the location designated by the released retargeted address.

In accordance with a first embodiment of the present invention, the programmable retargeter memory device of the present invention is comprised in an input/output (I/O) interface device of a computer graphics display system. The I/O interface device interfaces the host computer of the computer graphics display system with graphics hardware, which may include a geometry accelerator and a rasterizer.

The data sent by the host computer to the graphics hardware is received by the retargeter memory device and coalesced in the data memory. A read or a write to a particular location in the data memory causes the retargeted address stored in the associated location in the address memory to be released as the address to the graphics hardware followed by the data which was written to the particular location in the data memory. This feature of the present invention allows sequential data being sent to the I/O interface device to be coalesced in the data memory and then retargeted to non-sequential addresses in the graphics hardware using the retargeted addresses stored in the address memory.

In accordance with the preferred embodiment of the present invention, the programmable retargeter memory device of the present invention includes a re-order and release function which allows the sequence of the data sent to the data memory to be altered and released so that it is in a form suitable for use by the graphics hardware. In accordance with this embodiment, the programmable retargeter memory device preferably comprises an address memory, a data memory, eight address registers and eight data registers. The address memory and the data memory function in the same manner as discussed above. However, the retargeted addresses stored in the address memory may point to addresses in the graphics hardware or to the data registers. Each location in the address memory preferably contains eight control bits in addition to the retargeted address. Each control bit is associated with one address register and one data register. When one of the control bits is asserted, a write or a read to the data memory location associated with the memory address location containing the asserted bit will cause the contents of the address and data registers associated with the asserted bit to be released to the hardware located downstream before or after the retargeted address has been released. By using this feature of the present invention, the address memory and the address registers can be set up so that the sequence in which the data is received and coalesced by the data memory is altered before sending the data to the hardware located downstream.

BRIEF DESCRIPTION OF THE DRAWINGS

FIG. 4 illustrates a functional block diagram of the I/O interface of FIG. 3 comprising the programmable retargeter memory and retargeter registers of the present invention.

FIG. 5 illustrates a block diagram of the address memory locations in the retargeter memory shown in FIG. 4.

FIG. 6 illustrates a block diagram of the data memory locations in the retargeter memory shown in FIG. 4.

FIGS. 12A and 12B illustrate flow charts which demonstrate how the programmable retargeter of the present invention coalesces and retargets data.

DETAILED DESCRIPTION OF THE INVENTION

Figure 1:
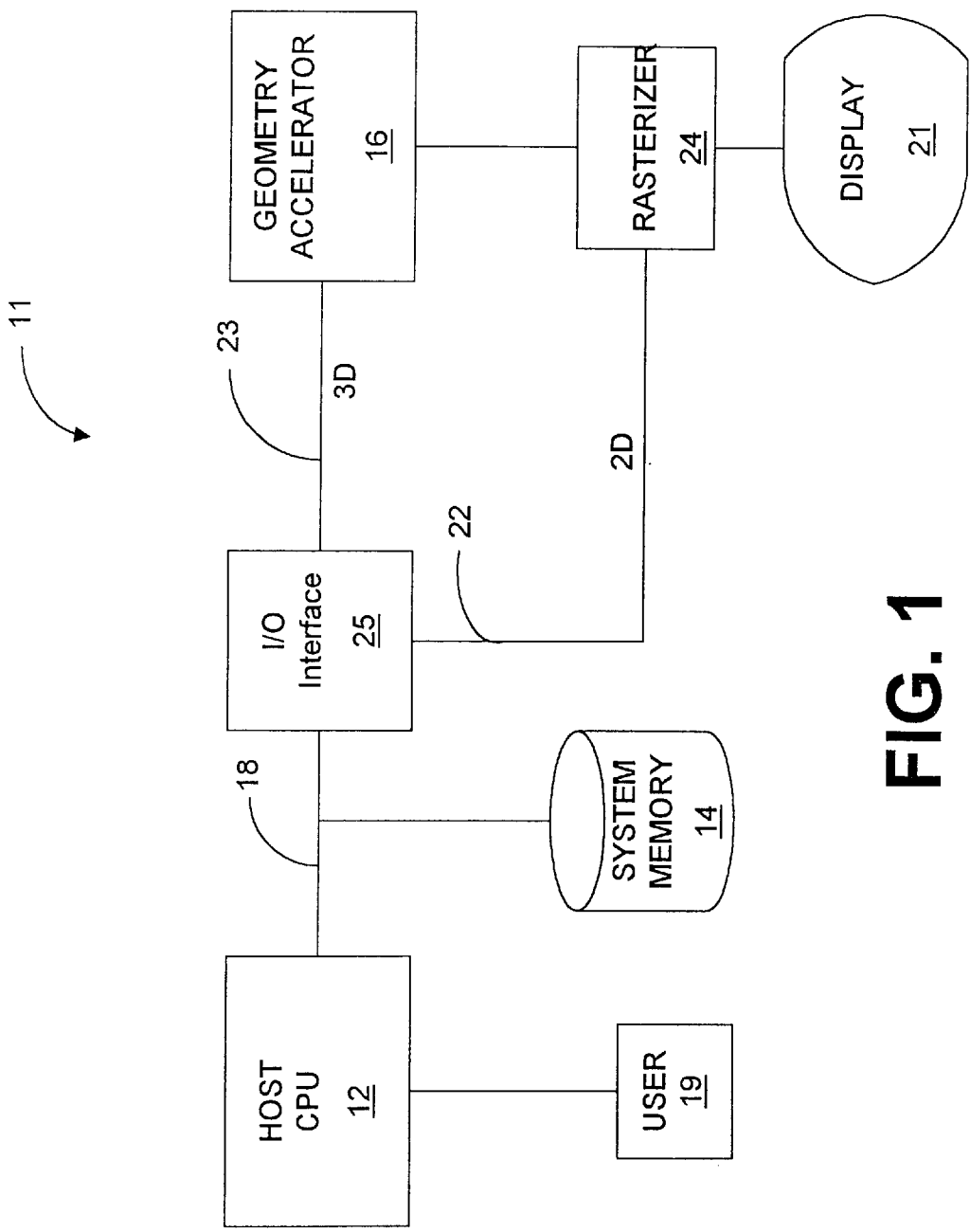
FIG. 1 illustrates a functional block diagram of a well known computer graphics display system.

The basic components of a conventional computer graphics display system are shown in FIG. 1. The computer graphics display system 11 comprises a CPU 12, system memory 14, a display device 21, a geometry accelerator 16, a rasterizer 24 and an I/O interface 25, which connects the geometry accelerator 16 and rasterizer 24 with the host CPU 12. The CPU 12 communicates with the geometry accelerator 16, the rasterizer 24 and system memory 14 via I/O bus 18, which may be, for example, a PCI or GSC bus. The I/O interface 25 is connected to the rasterizer 24 and to geometry accelerator 16 via I/O lines 22 and 23, respectively. When the data output to the graphics hardware is 2-D data, it is sent directly to the rasterizer 24. When the data output to the graphics hardware is 3-D data, it is sent to the geometry accelerator 16 and then to the rasterizer 24. A user 19 communicates with the CPU 12 via a peripheral device, such as a keyboard or mouse, to indirectly control the data being sent to the geometry accelerator 16, thereby controlling the rendering of the image being displayed on the display device 21.

Figure 2:
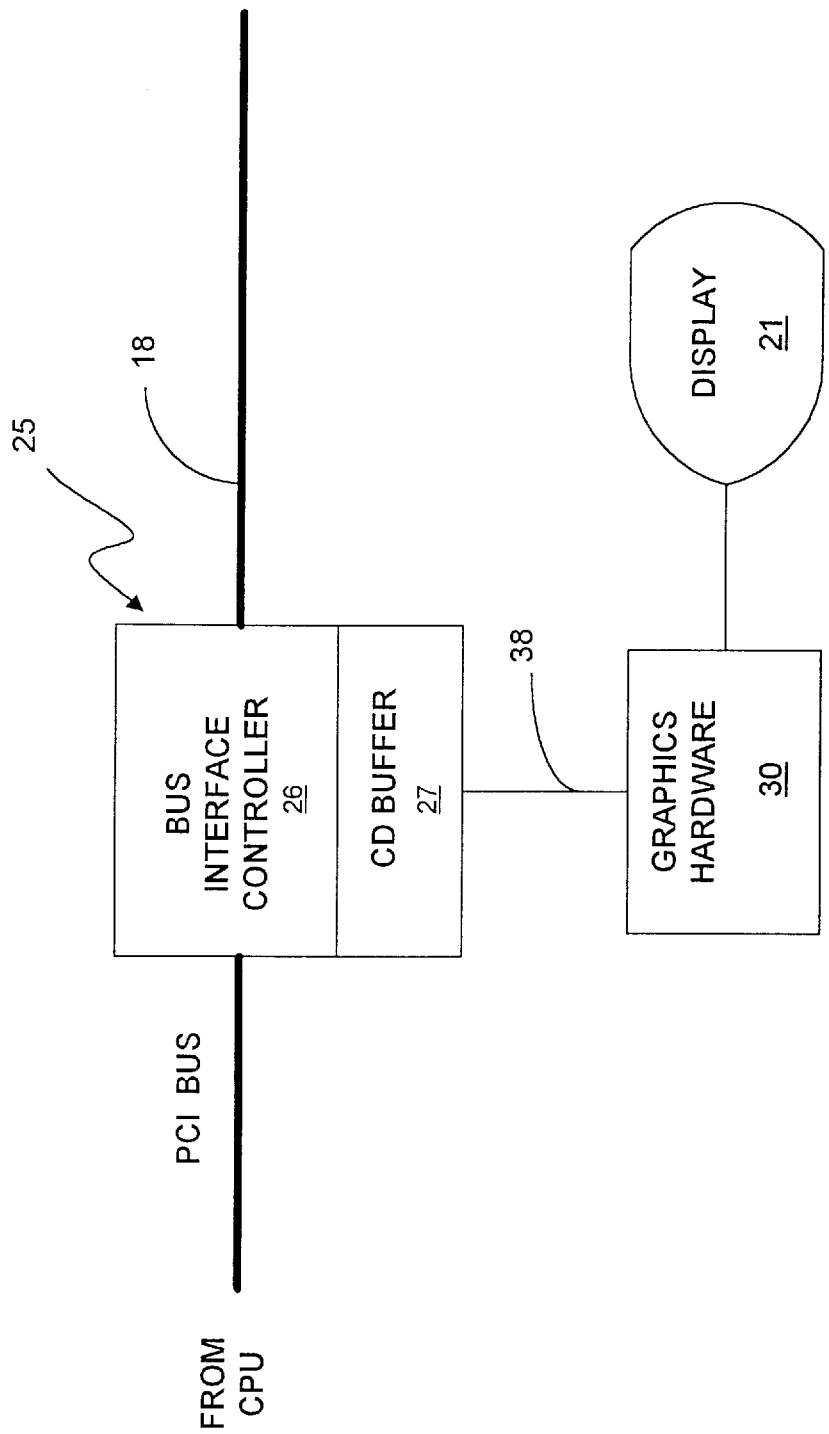
FIG. 2 illustrates a functional block diagram of the I/O interface of FIG. 1 for interfacing an I/O bus connected to the host CPU of a computer graphics display system with the graphics hardware of the computer graphics display system.

FIG. 2 is a functional block diagram illustrating the components of I/O interface 25 shown in FIG. 1. The I/O interface 25 comprises a bus controller 26 and a command data (CD) buffer 27 which temporarily stores the data being sent by the host CPU to the graphics hardware 30. Generally, when data is sent by the host CPU to the graphics hardware 30, certain pieces of the data are sent sequentially to the graphics hardware. With respect to the data that is being sent sequentially, coalescing can be used. As stated above, coalescing is a term used to describe a method for writing data to addresses wherein only the address of the first piece of data is sent with the data. The device receiving the data maintains an internal counter which increments the address to which the data is to be sent as additional pieces of data are received by the device. Therefore, only the address of the first piece of data needs to be sent, which significantly reduces the overall amount of data to be processed.

In known computer graphics display systems, the CD buffer 27 of the I/O interface 25 is used to coalesce data sent from the host CPU to the graphics hardware. In order to accomplish this, the data is written to sequential locations in the CD buffer in "bursts" of data with only the address to which the first piece of data is to be sent in the graphics hardware being designated followed by each additional piece of data being sent to the same address.

The data stored in the CD buffer is then output over a bus 38 to locations in the graphics hardware 30 designated by the addresses. The addresses to which the data is being sent in the graphics hardware 30 cannot be programmably altered, i.e., the only way to change the addresses to which the data is to be sent in the graphics hardware 30 is for the host CPU 12 to send new commands to the CD buffer designating the new addresses.

Figure 3:
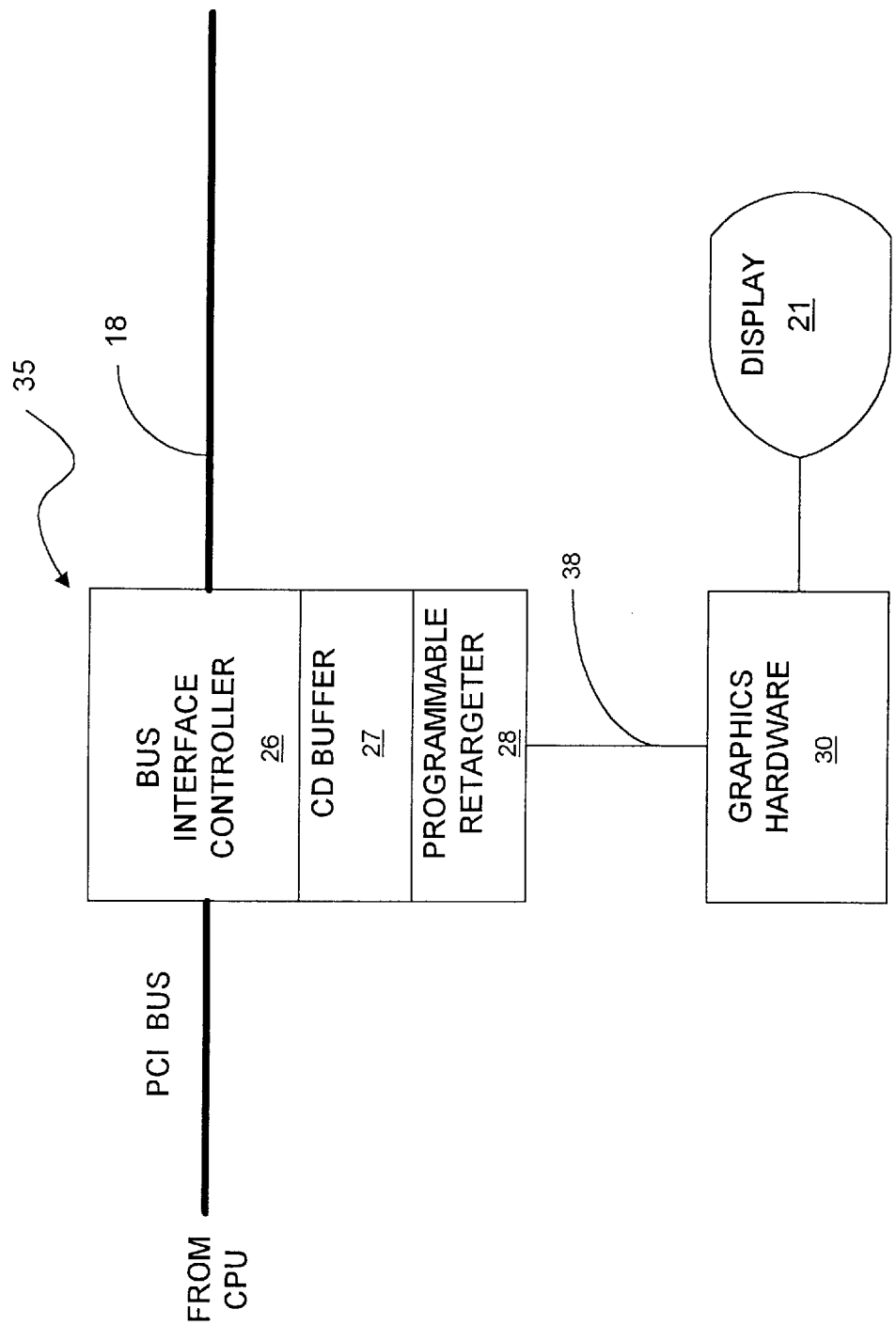
FIG. 3 illustrates a functional block diagram of the I/O interface of the present invention for interfacing an I/O bus connected to the host CPU of a computer graphics display system with the graphics hardware of the computer graphics display system.

FIG. 3 illustrates the I/O interface 35 of the present invention for interfacing the host CPU 12 via an I/O bus 18 with I/O devices, such as, for example, a geometry accelerator and/or a rasterizer of a computer graphics display system, which are designated collectively in FIG. 3 as graphics hardware 30. As shown in FIG. 3, in accordance with the present invention, the I/O interface 35 comprises the programmable retargeter 28 of the present invention which is capable of functioning both as a CD buffer to provide coalescing or/and as a retargeter to retarget the data being sent by the host CPU to the graphics hardware. Therefore, in accordance with the present invention, it is not necessary for a CD buffer to be used. However, the programmable retargeter of the present invention may be used in conjunction with a conventional CD buffer, in which case the CD buffer will perform coalescing of the data sent from the host CPU 12 and the programmable retargeter of the present invention will be used only for the purpose of retargeting and/or re-ordering the data. If it is deemed unnecessary or undesirable to perform coalescing, the programmable retargeter of the present invention may be implemented only for the purpose of retargeting and/or re-ordering of data and a CD buffer will not be used.

In accordance with the preferred embodiment of the present invention, the programmable retargeter 28 is used in conjunction with a CD buffer 27, as shown in FIG. 3. The data is coalesced in the CD buffer 27 and then output to the programmable retargeter 28. The programmable retargeter 28 then attaches a new address to the data and causes the data to be routed to the retargeted address downstream in the graphics hardware 30 over bus 38. The manner in which the programmable retargeter 28 of the present invention accomplishes this is described in detail below with respect to FIGS. 4 through 13B.

It should be noted that although the programmable retargeter of the present invention is being described herein only with respect to its use with graphics hardware, it will be apparent to those skilled in the art that the programmable retargeter of the present invention can be used with other types of devices. Furthermore, although the programmable retargeter of the present invention is being described herein with respect to its implementation in computer graphics display systems, this is being done only for illustrative purposes and it will be apparent to those skilled in the art that the programmable retargeter of the present invention is not limited to use only in connection with computer graphics display systems. In essence, the programmable retargeter of the present invention can be utilized advantageously under any circumstances where it is deemed desirable to retarget and/or re-order data. Therefore, the discussion being provided herein of the programmable retargeter of the present invention implemented in conjunction with a computer graphics display system is only for the purpose of illustrating the preferred embodiment of the present invention and is not to be construed as limiting the scope of the present invention.

FIG. 4 illustrates a functional block diagram of the programmable retargeter 28 of the present invention implemented in a computer graphics display system. The programmable retargeter 28 of the present invention preferably is comprised of a programmable retargeter memory 45, which provides the retargeting function of the present invention, and retargeter registers 44 which provide the re-ordering function of the present invention. However, it will be apparent to those skilled in the art that the present invention is not limited with respect to the manner in which the programmable retarget and re-order functions of the present invention are implemented. The programmable retargeter memory 45 preferably is comprised of 128 locations of randomly accessible address memory and 128 locations of randomly accessible data memory, each memory location preferably holding 32 bits. However, it will be apparent to those skilled in the art that the present invention is not limited with respect to the amount of memory comprised by the programmable retargeter memory device of the present invention. The address memory locations in the retargeter memory 45 store retargeted addresses and control bits. The data memory locations in the retargeter memory 45 are used for writing and reading data associated with the retargeted addresses to and from the retargeter memory 45.

The address memory locations of the programmable retargeter memory 45 and the data memory locations of the programmable retargeter memory 45 are illustrated in FIGS. 5 and 6, respectively. As illustrated in these figures, each address memory location is associated with exactly one data memory location. For example, when location DATA ADDRESS 0 in the data memory portion of the retargeter memory 45 is written to, the contents stored in location RETARGETED ADDRESS 0 in the address memory portion of the retargeter memory 45 will be released as the address to the graphics hardware located downstream followed by the data written to DATA ADDRESS 0.

Figure 7:
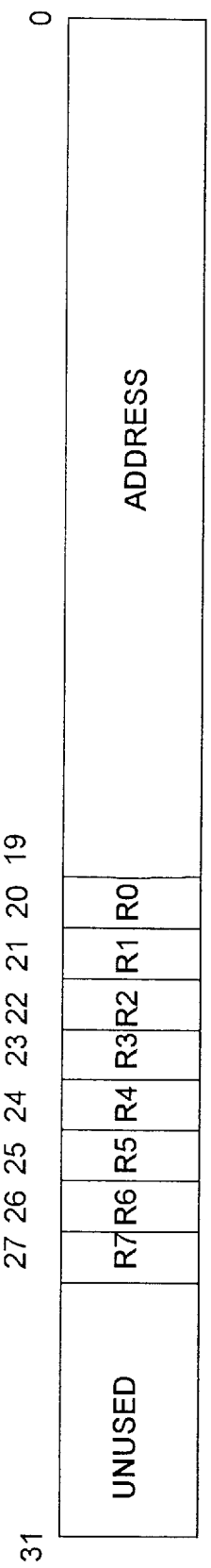
FIG. 7 illustrates the contents of the address memory locations of the retargeter memory shown in FIG. 5.

The contents of one of the address memory locations are shown in FIG. 7. Preferably, bits 0 through 19 correspond to the retargeted address and bits 20 through 27 are control bits which control the timing of the release of data from the retargeter registers 44. Bits 28 through 31 preferably are unused and are written as all zeros. Each of the eight control bits is associated with one pair of the retargeter registers 44, as discussed in more detail below with respect to FIGS. 9 through 11. A write into any of the locations in the address memory will cause the contents at that location to be updated, thus allowing the retargeted addresses to be programmably selected and altered.

Figure 8:
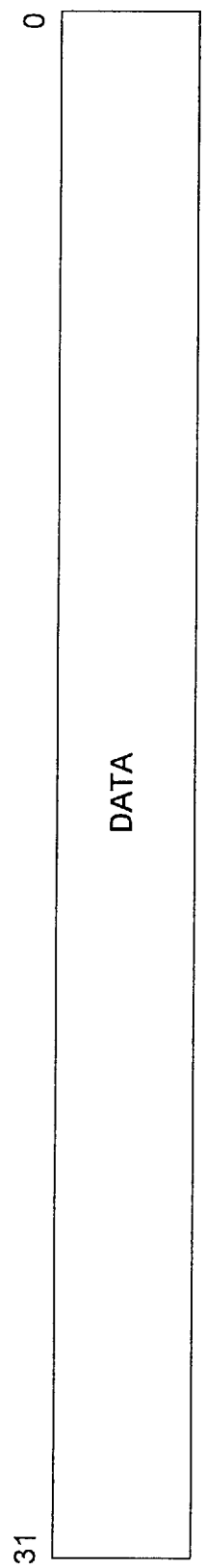
FIG. 8 illustrates the contents of the data memory locations of the retargeter memory shown in FIG. 6.
Figure 9:
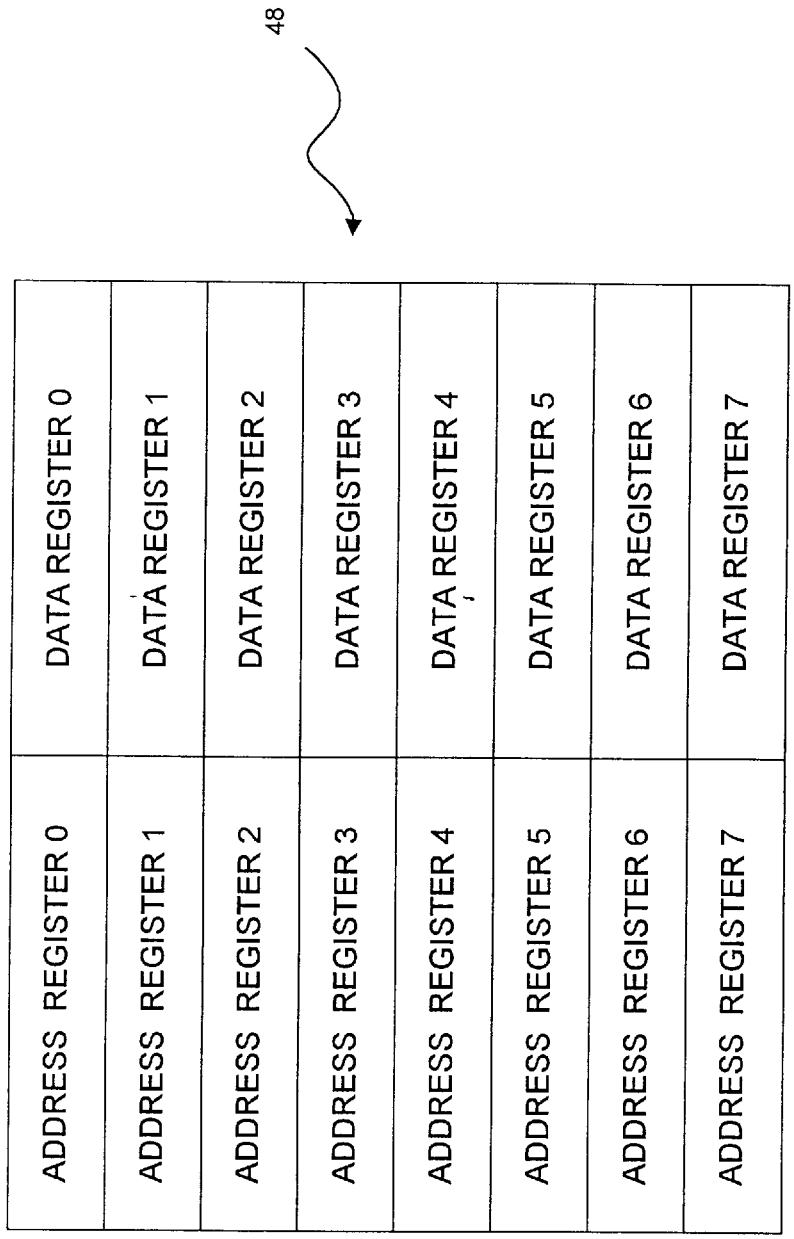
FIG. 9 illustrates a block diagram of the retargeter registers shown in FIG. 4.

The contents of one of the data memory locations of programmable retargeter memory 45 are shown in FIG. 8. The data bits in each data memory location represent data associated with the retargeted address stored in the corresponding address memory location. When data is sent by the host CPU to the graphics hardware, the data is coalesced in the data memory portion of the retargeter memory 45 in a manner similar to the manner in which coalescing is performed with conventional CD buffers. As demonstrated above, each location in the data memory is associated with one location in the address memory such that when a particular location in the data memory is written and/or read, depending on how the retargeter is configured, the contents of the associated address memory location are sent as the retargeted address to the graphics hardware 30 followed by the data.

Each retargeted address, i.e., each address in the address memory portion of retargeter memory 45, points to a location in the graphics hardware 30 or to one of the retargeter registers used for storing data. Preferably, the programmable retargeter of the present invention comprises a total of sixteen retargeter registers, each capable of holding a 32 bit word. The retargeter registers are shown in block diagram form in FIG. 9. Eight of the 32-bit registers are address registers and the other eight are data registers. Each data register is associated with one address register such that when the address stored in one of the address registers is released to the graphics hardware 30, the data stored in the associated data register will be released to the hardware 30.

Figure 10:
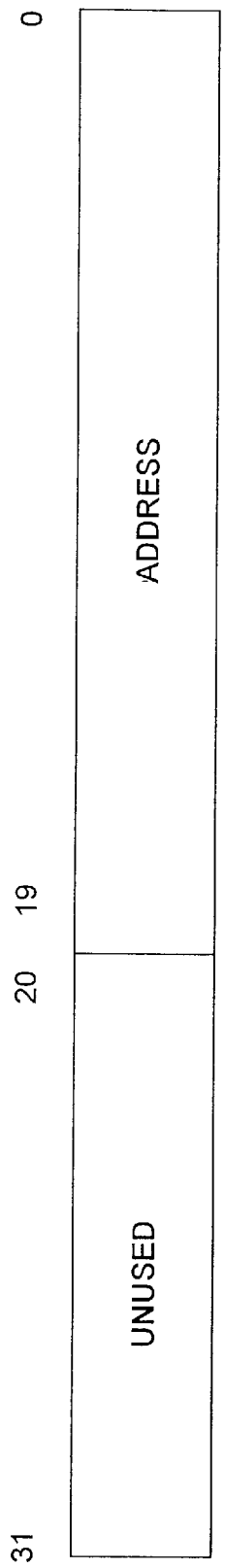
FIG. 10 illustrates the contents of one of the retargeter registers shown in FIG. 9 used for storing addresses.
Figure 11:
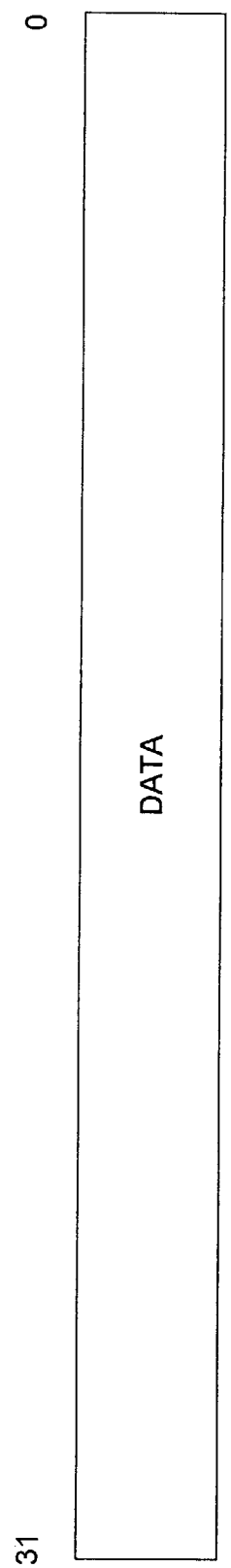
FIG. 11 illustrates the contents of one of the retargeter registers shown in FIG. 9 used for storing data.

Each address register is used for storing a retargeted address and each data register is used for storing data associated with the retargeted address. The contents of one of the address registers are shown in FIG. 10. The contents of one of the data registers are shown in FIG. 11.

As stated above, a read or a write from or to one of the data memory locations (FIG. 6) of the programmable retargeter memory 45 will cause the contents stored at the associated address memory location (FIG. 5) of the programmable retargeter memory 45 to be sent downstream to the graphics hardware 30 followed by the data written to or read from the data memory location. Each of the control bits is associated with one address register and one data register. If one of the control bits, R0 through R7, stored at a particular address memory location is asserted, the address and data registers (FIG. 9) associated with the asserted control bits will be released to the graphics hardware 30 after (or before, depending on how the retargeter is configured) the retargeted address associated with the asserted control bit has been sent to the graphics hardware 30. For example, if control bit R0 stored in location RETARGETED ADDRESS 0 (FIG. 5) is asserted, when DATA ADDRESS 0 (FIGS. 6) is written or read, the contents of ADDRESS REGISTER 0 and DATA REGISTER 0 (FIG. 9) will be released to the graphics hardware 30 after or before the address stored in RETARGETED ADDRESS 0 and the data stored at DATA ADDRESS 0 have been released to the hardware downstream.

If multiple control bits at a particular address memory location are asserted, when the corresponding data memory location is read, the associated address and data registers will be released to the graphics hardware 30 in ascending order (i.e., R0–R7) after the contents of the corresponding address memory and data memory locations have been sent to the graphics hardware 30.

Therefore, in accordance with the preferred embodiment of the present invention, the programmable retargeter provides a re-order and release function which allows the order of the data being sent by the host CPU to the graphics hardware 30 to be altered and the data to be released so that it is received by the graphics hardware 30 in the order in which the graphics hardware 30 expects to receive it.

The following example, which will be discussed with reference to FIGS. 12A and 12B, demonstrates the manner in which the programmable retargeter of the present invention may be used simply to enable coalescing and retargeting of vertex data when drawing triangles. In this example, the re-order and release function of the programmable retargeter is not being implemented.

When drawing triangles using the API known as OpenGL, the X, Y and Z coordinates are sent by the host CPU to the geometry accelerator as the last data in the vertex data. Most geometry accelerators expect to see the X, Y and Z coordinates last. Therefore, it is unnecessary to re-order the vertex data. However, it is still desirable to coalesce the vertex data. The following example illustrates how coalescing is accomplished using the retargeter of the present invention. In the interest of brevity, only the X, Y, Z and R, G, B data will be specifically referred to in this example, although it will be apparent to those skilled in the art that additional vertex data may, and usually will, be sent to the geometry accelerator and that the programmable retargeter of the present invention will operate on other vertex data in an analogous manner provided the retargeter has been set up for such data. It will be apparent to those skilled in the art how the retargeter of the present invention can be set up for additional types of data. It should also be noted that the programmable retargeter of the present invention is not limited to operating on vertex data, but that it can be used with virtually any type of data.

EXAMPLE 1

1. Referring now to FIG. 12A, the first step 50 is to load the address memory with the retargeted addresses for the R, G and B data for each vertex. In this example, locations 0, 1 and 2 in the address memory shown in FIG. 5 will be used. Therefore, location RETARGETED ADDRESS 0 is loaded with the address to which the R data for each vertex is to be sent in the geometry accelerator. Then, location "RETARGETER ADDRESS 1 is loaded with the address to which the G data for each vertex is to be sent in the geometry accelerator. The location RETARGETER ADDRESS 2 is loaded with the address to which the B data for each vertex is to be sent in the geometry accelerator.

2. The second step 51 is to load locations in the address memory with the retargeted addresses for the X, Y and Z data. Therefore, location RETARGETED ADDRESS 3 is loaded with the address to which the X coordinate for each vertex is to be sent in the geometry accelerator. Location RETARGETER ADDRESS 4 is loaded with the address to which the Y coordinate for each vertex is to be sent in the geometry accelerator. Location RETARGETER ADDRESS 5 is loaded with the address to which the Z coordinate for each vertex is to be sent in the geometry accelerator.

3. The third step is to draw the triangle by writing the X, Y, Z, R, G and B data to the data memory portion of the retargeter memory shown in FIG. 6. This step actually comprises several steps, which are set forth below as steps A through F. As stated above, when a location in the data memory is written or read, the contents stored in the associated address in the address memory will be released as the address to the geometry accelerator. Therefore, the R, G and B data will be written to the data memory locations before the X, Y and Z data is written so that the R, G, B data will be received by the geometry accelerator before the X, Y, Z data. Since this is the way that OpenGL writes the data anyway, the re-order and release function of the present invention is unnecessary.

A. In step 52, the R data for vertex 0 is written to data memory location DATA ADDRESS 0, thus causing the retargeted address stored at RETARGETED ADDRESS 0 to be released and sent as the address to the geometry accelerator for R data followed by the contents written to DATA ADDRESS 0. In step 53, the G data for vertex 0 is then written to data memory location DATA ADDRESS 1, thus causing the retargeted address stored at RETARGETED ADDRESS 1 to be released and sent as the address to the geometry accelerator for G data followed by the contents written to DATA ADDRESS 1. In step 54, the B data for vertex 0 is then written to data memory location DATA ADDRESS 2, thus causing the retargeted address stored at RETARGETED ADDRESS 2 to be released and sent as the address to the geometry accelerator for B data followed by the contents written to DATA ADDRESS 2.

B. Next, in step 55, the X data for vertex 0 is written to data memory location DATA ADDRESS 3, thus causing the retargeted address stored at RETARGETED ADDRESS 3 to be released and sent as the address to the geometry accelerator for X data followed by the contents written to DATA ADDRESS 3. In step 56, the Y data for vertex 0 is written to data memory location DATA ADDRESS 4, thus causing the retargeted address stored at RETARGETED ADDRESS 4 to be released and sent as the address to the geometry accelerator for Y data followed by the contents written to DATA ADDRESS 4. In step 57, the Z data for vertex 0 is written to data memory location DATA ADDRESS 5, thus causing the retargeted address stored at RETARGETED ADDRESS 5 to be released and sent as the address to the geometry accelerator for Z data followed by the contents written to DATA ADDRESS 5.

C. Next, in step 60, shown in FIG. 12B, the R data for vertex 1 is written to data memory location DATA ADDRESS 0, thus causing the retargeted address stored at RETARGETED ADDRESS 0 to be released and sent as the address to the geometry accelerator for R data followed by the contents written to DATA ADDRESS 0. In step 61, the G data for vertex 1 is written to data memory location DATA ADDRESS 1, thus causing the retargeted address stored at RETARGETED ADDRESS 1 to be released and sent as the address to the geometry accelerator for G data followed by the contents written to DATA ADDRESS 1. In step 62, the B data for vertex 1 is then written to data memory location DATA ADDRESS 2, thus causing the retargeted address stored at RETARGETED ADDRESS 2 to be released and sent as the address to the geometry accelerator for B data followed by the contents written to DATA ADDRESS 2.

D. Next, in step 63, the X data for vertex 1 is written to data memory location DATA ADDRESS 3, thus causing the retargeted address stored at RETARGETED ADDRESS 3 to be released and sent as the address to the geometry accelerator for X data followed by the contents written to DATA ADDRESS 3. In step 64, the Y data for vertex 1 is then written to data memory location DATA ADDRESS 4, thus causing the retargeted address stored at RETARGETED ADDRESS 4 to be released and sent as the address to the geometry accelerator for Y data followed by the contents written to DATA ADDRESS 4. In step 65, the Z data for vertex 1 is then written to data memory location DATA ADDRESS 5, thus causing the retargeted address stored at RETARGETED ADDRESS 5 to be released and sent as the address to the geometry accelerator for Z data followed by the contents written to DATA ADDRESS 5.

E. Next, in step 66, the R data for vertex 2 is written to data memory location DATA ADDRESS 0, thus causing the retargeted address stored at RETARGETED ADDRESS 0 to be released and sent as the address to the geometry accelerator for R data followed by the contents written to DATA ADDRESS 0. In step 67, the G data for vertex 2 is then written to data memory location DATA ADDRESS 1, thus causing the retargeted address stored at RETARGETED ADDRESS 1 to be released and sent as the address to the geometry accelerator for G data followed by the contents written to DATA ADDRESS 1. In step 68, the B data for vertex 2 is then written to data memory location DATA ADDRESS 2, thus causing the retargeted address stored at RETARGETED ADDRESS 2 to be released and sent as the address to the geometry accelerator for B data followed by the contents written to DATA ADDRESS 2.

F. Finally, the X, Y and Z coordinates for vertex 2 are written. In step 69, the X data for vertex 2 is written to data memory location DATA ADDRESS 3, thus causing the retargeted address stored at RETARGETED ADDRESS 3 to be released and sent as the address to the geometry accelerator for X data followed by the contents written to DATA ADDRESS 3. In step 70, the Y data for vertex 2 is written to data memory location DATA ADDRESS 4, thus causing the retargeted address stored at RETARGETED ADDRESS 4 to be released and sent as the address to the geometry accelerator for Y data followed by the contents written to DATA ADDRESS 4. In step 71, the Z data for vertex 2 is written to data memory location DATA ADDRESS 5, thus causing the retargeted address stored at RETARGETED ADDRESS 5 to be released and sent as the address to the geometry accelerator for Z data followed by the contents written to DATA ADDRESS 5.

Figure 12A:
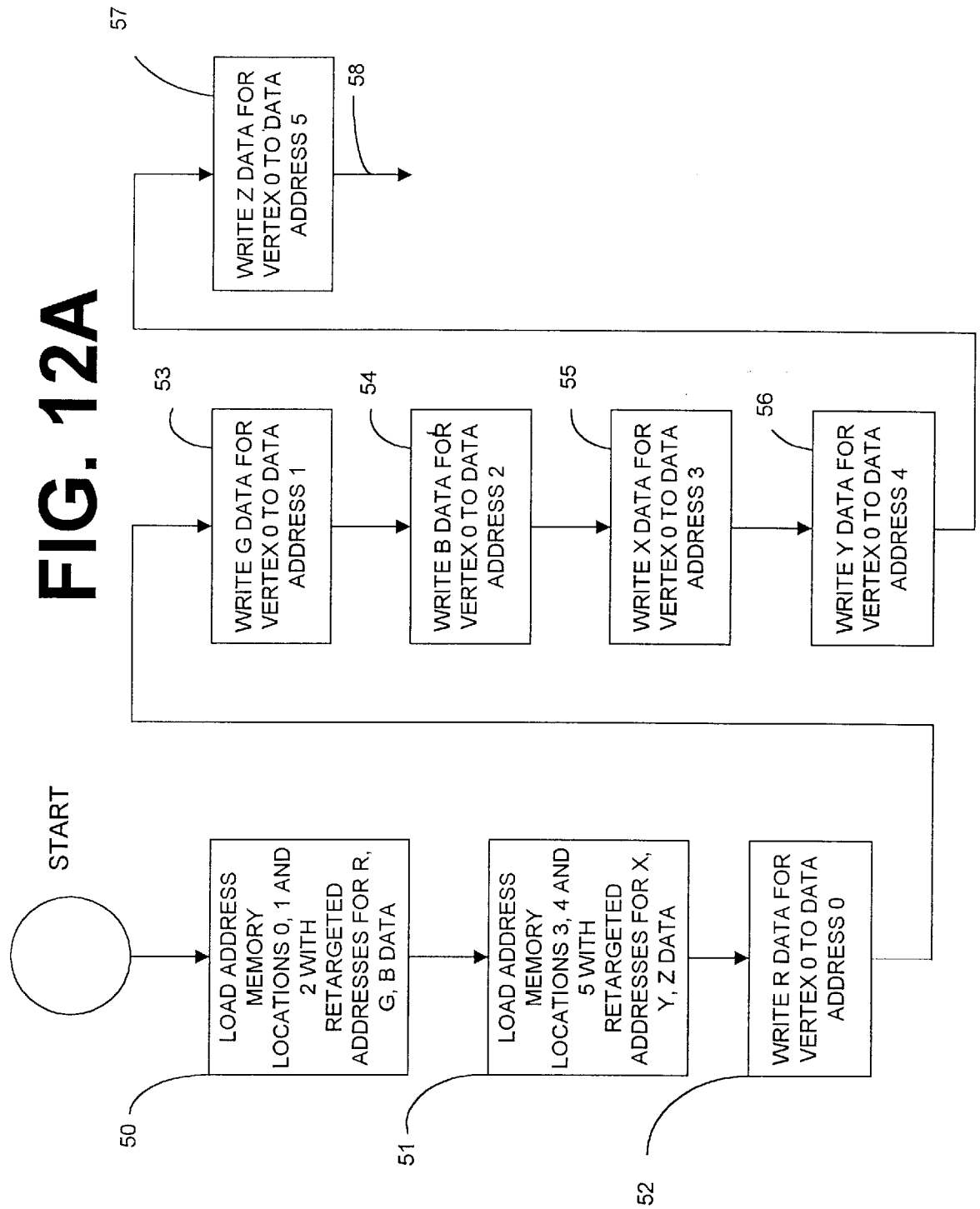

It should be noted although the process steps shown in FIGS. 12A and 12B have been described as separate steps occurring in a given sequence, this is merely for ease of illustration. Some of the process steps shown as separate steps may occur simultaneously and/or in a different sequence. For example, steps 50 and 51 may occur simultaneously.

As demonstrated by the preceding example, once the retargeter memory has been set up by loading the appropriate address memory locations with the retargeted addresses, coalescing of the vertex data being sent to the data memory locations is achieved by sending the vertex data sequentially to the associated data memory locations. Furthermore, since the address memory locations of the retargeter memory can be written to in order to change their contents, the retargeted addresses can be programmably altered merely by writing new retargeted addresses to the address memory locations. This feature of the present invention allows coalescing to be accomplished by the retargeter even with different types of data being sent to different, non-sequential addresses in the hardware located downstream of the retargeter.

Figure 13A:
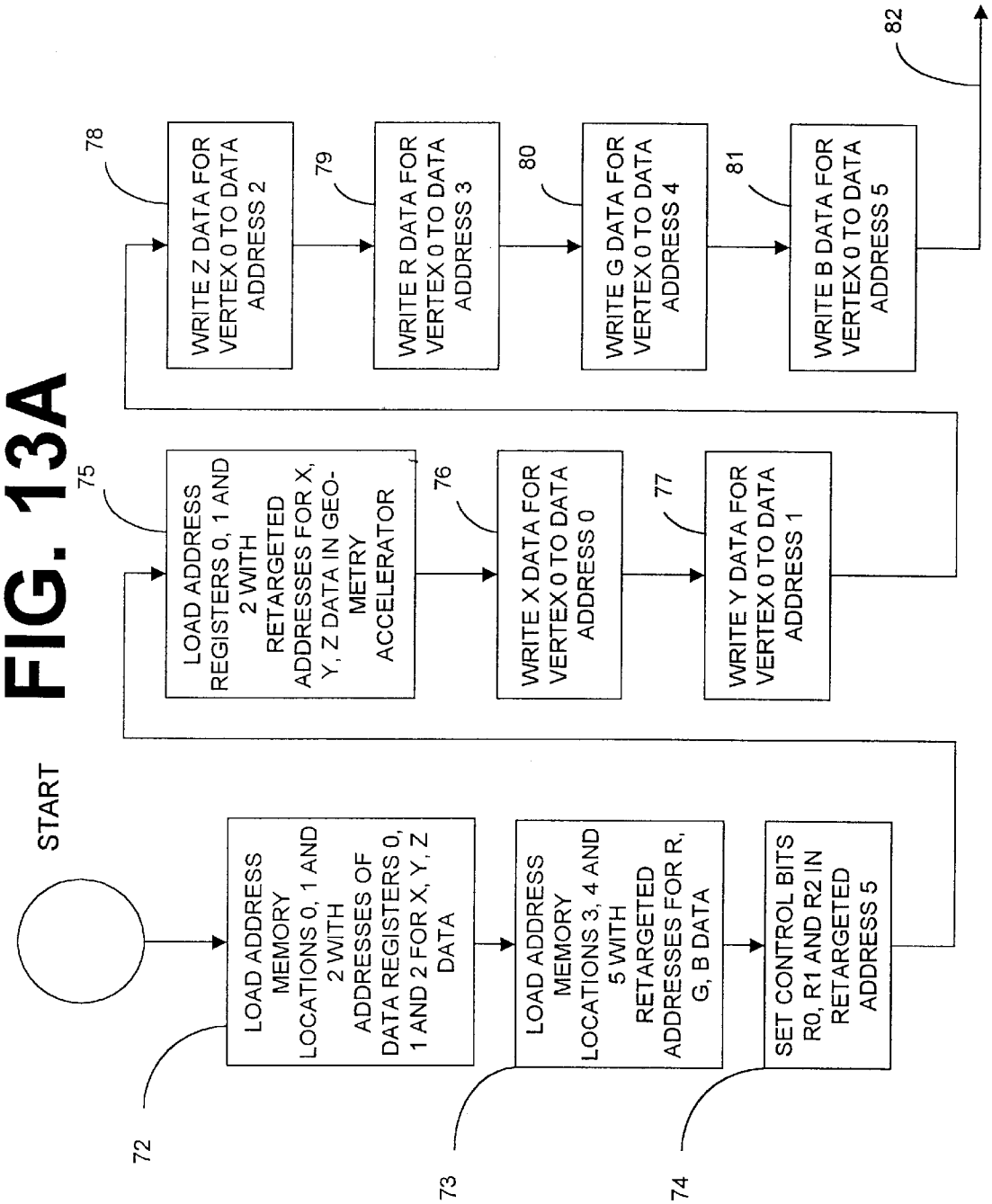
FIGS. 13A and 13B illustrate flow charts which demonstrate the re-order and release function of the programmable retargeter of the present invention.
Figure 13B:
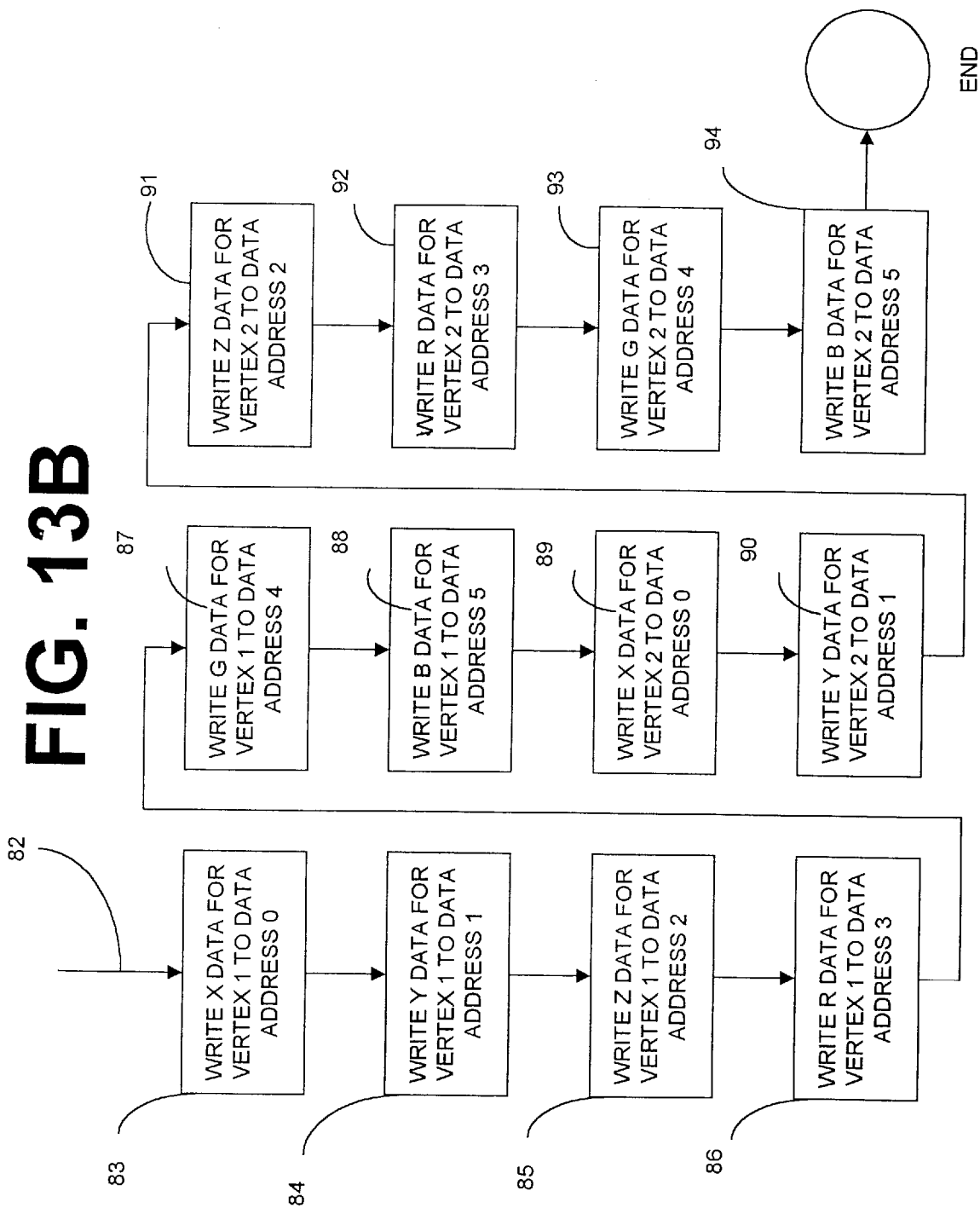

The following example, which will be discussed with reference to FIGS. 13A and 13B, demonstrates the manner in which the programmable retargeter of the present invention can be used to coalesce data and re-order it into a form suitable for receipt by the hardware located downstream of the retargeter. As stated above, the API known as Starbase sends the X, Y, Z data before the R, G, B data, whereas the geometry accelerator often needs to see the X, Y, Z data last. The data can be re-ordered in the manner discussed below so that the geometry accelerator sees the X, Y, Z data last. It should be noted that some of the process steps may occur simultaneously and/or in a different sequence, although for purposes of illustration they have been shown as occurring at separate times in a given sequence. For example, steps 72, 73, 74 and 75 may occur simultaneously.

EXAMPLE 2

1. The first step 72 is to set up the address memory so that the retargeted addresses for the X Y, Z data point to the data retargeter registers. This is done by loading address memory location RETARGETED ADDRESS 0 with the address of the retargeter register designated DATA REGISTER 0. The location RETARGETED ADDRESS 1 is loaded with the address of retargeter register DATA REGISTER 1. Address memory location RETARGETER ADDRESS 2 is loaded with the address of retargeter register DATA REGISTER 2.

2. The second step 73 is to load the address memory with retargeted addresses for the R, G, B data. Therefore, address memory location RETARGETED ADDRESS 3 is loaded with the address to which the R data for each vertex is to be sent in the geometry accelerator. Memory address location RETARGETER ADDRESS 4 is loaded with the address to which the G data for each vertex is to be sent in the geometry accelerator. Memory address location RETARGETER ADDRESS 5 is loaded with the address to which the B data for each vertex is to be sent in the geometry accelerator. Also, since the X, Y, Z data is to be released from the DATA REGISTERS 0, 1 AND 2 after the B data has been released to the geometry accelerator, control bits R0, R1 and R2 are asserted in RETARGETER ADDRESS 5, as indicated in step 74, although this actually occurs when the B data is written to RETARGETER ADDRESS 5.

3. The third step 75 is to load the address retargeter registers with the retargeted addresses to which the X, Y and Z data is to be sent in the geometry accelerator. To accomplish this, retargeter register ADDRESS REGISTER 0 is loaded with the address to which X data must sent in the geometry accelerator. Retargeter register ADDRESS REGISTER 1 is loaded with the address to which Y data must sent in the geometry accelerator. Retargeter register ADDRESS REGISTER 2 is loaded with the address to which Z data must sent in the geometry accelerator.

4. The fourth step is to draw the triangle. This step comprises several steps, which are set forth below as steps A through F.

A. In step 76, the X data for vertex 0 is written to data memory location DATA ADDRESS 0, thus causing the retargeted address stored at RETARGETED ADDRESS 0 to be released as the address for the contents stored at DATA ADDRESS 0. Since the retargeted address is the address of DATA REGISTER 0, the X data will be sent to DATA REGISTER 0. In step 77, the Y data for vertex 0 is written to data memory location DATA ADDRESS 1, thus causing the retargeted address stored at RETARGETED ADDRESS 1 to be released as the address for the contents stored at DATA ADDRESS 1. Since the retargeted address is the address of DATA REGISTER 1, the Y data will be sent to DATA REGISTER 1. In step 78, the Z data for vertex 0 is then written to data memory location DATA ADDRESS 2, thus causing the retargeted address stored at RETARGETED ADDRESS 2 to be released as the address for the contents stored at DATA ADDRESS 2. Since the retargeted address is the address of DATA REGISTER 2, the Z data will be sent to DATA REGISTER 2.

B. Next, in step 79, the R data for vertex 0 is written to data memory location DATA ADDRESS 3, thus causing the retargeted address stored at RETARGETED ADDRESS 3 to be released and sent as the address to the geometry accelerator for R data followed by the contents stored at DATA ADDRESS 3. In step 80, the G data for vertex 0 is then written to the location in the data memory location DATA ADDRESS 4, thus causing the retargeted address stored at RETARGETED ADDRESS 4 to be released and sent as the address to the geometry accelerator for G data followed by the contents stored at DATA ADDRESS 4. In step 81, the B data for vertex 0 is then written to the location in the data memory designated DATA ADDRESS 5, thus causing the retargeted address stored at RETARGETED ADDRESS 5 to be released and sent as the address to the geometry accelerator for B data followed by the contents stored at DATA ADDRESS 5. This will also cause the contents of ADDRESS REGISTERS 0, 1 and 2 and DATA REGISTERS 0,1 and 2, which correspond to the Y, Z data for vertex 0 and the addresses to which this data is being sent in the geometry accelerator to be released to the geometry accelerator.

C. Next, in step 83, the X data for vertex 1 is written to data memory location DATA ADDRESS 0, thus causing the retargeted address stored at RETARGETED ADDRESS 0 to be released as the address for the contents stored at DATA ADDRESS 0. Since the retargeted address is the address of DATA REGISTER 0, the X data will be sent to DATA REGISTER 0. In step 84, the Y data for vertex 1 is then written to data memory location DATA ADDRESS 1, thus causing the retargeted address stored at RETARGETED ADDRESS 1 to be released as the address for the contents stored at DATA ADDRESS 1. Since the retargeted address is the address of DATA REGISTER 1, the Y data will be sent to DATA REGISTER 1. In step 85, the Z data for vertex 1 is then written to data memory location DATA ADDRESS 2, thus causing the retargeted address stored at RETARGETED ADDRESS 2 to be released as the address for the contents stored at DATA ADDRESS 2. Since the retargeted address is the address of DATA REGISTER 2, the Z data will be sent to DATA REGISTER 2.

D. Next, in step 86, the R data for vertex I is written to the location in the data memory location DATA ADDRESS 3, thus causing the retargeted address stored at RETARGETED ADDRESS 3 to be released and sent as the address to the geometry accelerator for R data followed by the contents stored at DATA ADDRESS 3. In step 87, the G data for vertex 1 is then written to data memory location DATA ADDRESS 4, thus causing the retargeted address stored at RETARGETED ADDRESS 4 to be released and sent as the address to the geometry accelerator for G data followed by the contents stored at DATA ADDRESS 4. In step 88, the B data for vertex I is then written to data memory location DATA ADDRESS 5, thus causing the retargeted address stored at RETARGETED ADDRESS 5 to be released and sent as the address to the geometry accelerator for B data followed by the contents stored at DATA ADDRESS 5. This will also cause the contents of ADDRESS REGISTERS 0, 1 and 2 and DATA REGISTERS 0,1 and 2, which correspond to the X Y, Z data for vertex 1 and the addresses to which this data is being sent in the geometry accelerator to be released to the geometry accelerator.

E. Next, in step 89, the X data for vertex 2 is written to data memory location DATA ADDRESS 0, thus causing the retargeted address stored at RETARGETED ADDRESS 0 to be released as the address for the contents stored at DATA ADDRESS 0. Since the retargeted address is the address of DATA REGISTER 0, the X data will be sent to DATA REGISTER 0. In step 90, the Y data for vertex 2 is then written to data memory location DATA ADDRESS 1, thus causing the retargeted address stored at RETARGETED ADDRESS 1 to be released as the address for the contents stored at DATA ADDRESS 1. Since the retargeted address is the address of DATA REGISTER 1, the Y data will be sent to DATA REGISTER 1. In step 91, the Z data for vertex 2 is then written to data memory location DATA ADDRESS 2, thus causing the retargeted address stored at RETARGETED ADDRESS 2 to be released as the address for the contents stored at DATA ADDRESS 2. Since the retargeted address is the address of DATA REGISTER 2, the Z data will be sent to DATA REGISTER 2.

F. Next, in step 92, the R data for vertex 2 is written to the location in the data memory location DATA ADDRESS 3, thus causing the retargeted address stored at RETARGETED ADDRESS 3 to be released and sent as the address to the geometry accelerator for R data followed by the contents stored at DATA ADDRESS 3. In step 93, the G data for vertex 2 is then written to data memory location DATA ADDRESS 4, thus causing the retargeted address stored at RETARGETED ADDRESS 4 to be released and sent as the address to the geometry accelerator for G data followed by the contents stored at DATA ADDRESS 4. In step 94, the B data for vertex 2 is then written to data memory location DATA ADDRESS 5, thus causing the retargeted address stored at RETARGETED ADDRESS 5 to be released and sent as the address to the geometry accelerator for B data followed by the contents stored at DATA ADDRESS 5. This will also cause the contents of ADDRESS REGISTERS 0, 1 and 2 and DATA REGISTERS 0,1 and 2, which correspond to the X, Y, Z data for vertex 2 and the addresses to which this data is being sent in the geometry accelerator to be released to the geometry accelerator.

Therefore, as demonstrated by Example 2, although the X, Y and Z data is written to the programmable retargeter of the present invention before the R, G, B data is written, the X, Y, and Z data and the addresses in the geometry accelerator for the X, Y and Z data are sent to the geometry accelerator for each vertex after the R, G and B data for that vertex has been sent to the geometry accelerator. Therefore, not only is the programmable retargeter of the present invention capable of allowing the data being sent to it to be coalesced, the programmable retargeter of the present invention provides a release and re-order function for re-ordering the data into a form suitable for use by the hardware located downstream of the programmable retargeter.

It should be noted that the present invention has been described with respect to the preferred embodiments for the purposes of illustration only and that the present invention is not limited to these embodiments. It will be apparent to those skilled in the art that modifications may be made to the present invention without deviating from the spirit and scope of the present invention.

What is claimed is:

1. A retargeter memory device comprising:
    a first address memory space having a plurality of first address locations and a plurality of second address locations, said first and second address locations containing retargeted addresses designating locations, said first address memory space capable of being written to and read from to programmably alter the retargeted addresses stored therein and to output retargeted addresses therefrom;
    a second address memory space having a plurality of address locations for storing retargeted addresses designating locations, said second address space capable of being written to and read from to programmably alter the retargeted addresses stored therein and to output retargeted addresses therefrom;
    a first data memory space having a plurality of data memory locations for storing data, said first data memory space capable of being written to and read from, each data memory location in said first data memory space being associated with one address location in said first address memory space;
    a second data memory space having a plurality of data memory location for storing data, said second data memory space capable of being written to and read from, each memory location in said second data memory space being associated with one memory location in said second address memory space, wherein when data is written to a location in said first data memory space which is associated with a second address location in said first address memory space, the retargeted address stored in the associated second address location is released from said associated second address location and the data written to said first data memory space is routed to and stored in a re-ordering data memory location in said second data memory space, said re-ordering data memory location being designated by the retargeted address released from said associated second address location.

2. The retargeter memory device of claim 1, wherein when data is written to a data memory location in said first data memory space that is associated with a first address location in said first address memory space, the retargeted address stored at the associated first address location in said first address memory space is released from said associated first address location and the data written to the data memory location associated with said associated first address location is sent to the retargeted address released from said associated first address location.

3. The retargeter memory device of claim 2, wherein once the data has been sent to the retargeted address released from said associated first address location, the retargeted address stored at the location in said second address memory space which is associated with the re-ordering data memory location is released and the data stored in the re-ordering data memory location is released and sent to the retargeted address released from said second address memory space.

4. The retargeter memory device of claim 3 wherein said retargeter memory device is connected to a host computer which sends data to said retargeter memory device, wherein said retargeter memory device stores the data sent by said host computer in locations in said first data memory space, wherein the retargeted addresses stored in said first address locations and in said second address memory space correspond to addresses in graphics hardware connected to said retargeter memory device.

5. The retargeter memory device of claim 3 wherein said retargeter memory device is comprised in an input/output interface device of a computer graphics display system, said computer graphics display system comprising a host computer and graphics hardware, said input/output interface device interfacing said host computer with said graphics hardware, wherein said host computer sends sequential data destined for said graphics hardware to said input/output interface, said sequential data being received by said retargeter memory device and coalesced in sequential locations in said first data memory space, wherein the retargeted addresses in said first address memory space which are associated with said sequential locations in said first data memory space correspond to non-sequential addresses in the graphics hardware.

6. The retargeter memory device of claim 5, wherein each address location in said first address memory space contains a plurality of control bits, each control bit being associated with one location in said second data memory space and with one location in said second address memory space, wherein when data is written to a location in said first data memory space that is associated with a location in said first address memory space which contains an asserted control bit, data stored in a location in said second data memory space associated with said asserted control bit and a retargeted address stored in a location in said second address memory space associated with said asserted control bit will be released after the retargeted address stored at the location in said first address memory space which contains the asserted control bit has been released.

7. The retargeter memory device of claim 1, wherein said retargeter memory device is connected to a host computer which sends data to said retargeter memory device, wherein said retargeter memory device stores the data sent by said host computer in locations in said first data memory space, wherein the retargeted addresses stored in said first address locations and in said second address memory space correspond to addresses in graphics hardware connected to said retargeter memory device.

8. The retargeter memory device of claim 1, wherein said retargeter memory device is comprised in an input/output interface device of a computer graphics display system, said computer graphics display system comprising a host computer and graphics hardware, said input/output interface device interfacing said host computer with said graphics hardware, wherein said host computer sends sequential data destined for said graphics hardware to said input/output interface, said sequential data being received by said retargeter memory device and coalesced in sequential locations in said first data memory space, wherein the retargeted addresses in said first address memory space which are associated with said sequential locations in said first data memory space correspond to non-sequential addresses in the graphics hardware.

9. The retargeter memory device of claim 1, wherein each address location in said first address memory space contains a plurality of control bits, each control bit being associated with one location in said second data memory space and with one location in said second address memory space, wherein when data is written to a location in said first data memory space that is associated with a location in said first address memory space which contains an asserted control bit, data stored in a location in said second data memory space associated with said asserted control bit and a retargeted address stored in a location in said second address memory space associated with said asserted control bit will be released after the retargeted address stored at the location in said first address memory space which contains the asserted control bit has been released.

10. A method of re-ordering data comprising the steps of:
storing a retargeted address at a first location in a first address memory space comprised in a retargeter memory device, said retargeted address stored at said first location designating a first address;
storing a retargeted address at a second location in said first address memory space, said retargeted address stored at said second location designating a second address;
storing a retargeted address at a location in a second address memory space comprised in said retargeter memory device, said retargeted address stored in said second address memory space designating a third address;
writing data to a first location in a first data memory space which is associated with said first location in said first address memory space;
writing data to a second location in said first data memory space which is associated with said second location in said first address memory space, wherein when data is written to said first location in said first data memory space, the retargeted address stored at said first location in said first address memory space is released from said first location in said first address memory space and the data written to said first location in said first data memory space is routed to and stored in a re-ordering data memory location in a second data memory space, said re-ordering data memory location being designated by said first address, wherein when data is written to said second location in said first data memory space, the retargeted address stored at said second location in said first address memory space is released from said second location in said first address memory space and the data written to said second location in said first data memory space is sent to said second address.

11. The method of claim 10 wherein said re-ordering data memory location is associated with the retargeted address stored in said second address memory space, and wherein once the retargeted address stored at said second location in said first address memory space is released from said second location in said first address memory space and once the data written to said second location in said first data memory space is sent to said second address, the retargeted address stored in said second address memory space is released from said second address memory space and the data stored in said re-ordering data memory location is released from said second data memory space and sent to said third address.

12. The method of claim 11 wherein said step of storing a retargeted address at a second location in said first address memory space includes a step of storing at least one control bit at said second location in said first address memory space, said at least one control bit being associated with said re-ordering data memory location and with said location in said second address memory space, wherein when said control bit is asserted, the asserted control bit will cause the address stored at said location in said second address memory space to be released from said location in said second address memory space and the data stored in said re-ordering data memory location to be released from said second data memory space and sent to said third address after the data written to said second location in said first data memory space has been sent to said second address.

13. The method of claim 12 wherein said retargeter memory device is comprised in an input/output interface of a computer graphics display system, said input/output interface device interfacing a host computer of the computer graphics display system with graphics hardware, wherein said second and third addresses correspond to addresses in said graphics hardware.

14. The method of claim 11 wherein said step of storing a retargeted address at a second location in said first address memory space includes a step of storing at least one control bit at said second location in said first address memory space, said at least one control bit being associated with said re-ordering data memory location and with said location in said second address memory space, wherein when said control bit is asserted, the asserted control bit will cause the address stored at said location in said second address memory space to be released from said location in said second address memory space and the data stored in said re-ordering data memory location to be released from said second data memory space and sent to said third address when the data is written to said second location in said first data memory space and before the data written to said second location in said first data memory space has been sent to said second address.

15. The method of claim 14 wherein said retargeter memory device is comprised in an input/output interface of a computer graphics display system, said input/output interface device interfacing a host computer of the computer graphics display system with graphics hardware, wherein said second and third addresses correspond to addresses in said graphics hardware.

* * * * *

UNITED STATES PATENT AND TRADEMARK OFFICE
CERTIFICATE OF CORRECTION

PATENT NO. : 5,883,642
DATED : March 16, 1999
INVENTOR(S) : Troy M. Thomas et al.

It is certified that error appears in the above-identified patent and that said Letters Patent is hereby corrected as shown below:

<u>Column 11,</u>
Line 55, delete "Y,Z" and insert therefor -- X, Y, Z --

Signed and Sealed this

Third Day of December, 2002

JAMES E. ROGAN
*Director of the United States Patent and Trademark Office*